United States Patent

[11] 3,610,897

[72] Inventors George R. Gerhard
Columbus;
James E. Reider, Columbus, Ohio; Charles S. Walker, Sparta, N.J.
[21] Appl. No. 356,176
[22] Filed Mar. 31, 1964
[45] Patented Oct. 5, 1971
[73] Assignee Industrial Nucleonics Corporation

[54] METHOD AND CONTROL APPARATUS FOR REGULATING THE PROPERTY OF A MATERIAL ZONE TO A TARGET PROPERTY
29 Claims, 8 Drawing Figs.

[52] U.S. Cl. .................................................... 235/151.1, 235/151.3
[51] Int. Cl. .................................................... G06g 7/66
[50] Field of Search........................................72/16; 18/2; 235/151.1, 151.11, 151.13, 151.3

[56] References Cited
UNITED STATES PATENTS

| | | | |
|---|---|---|---|
| 3,007,052 | 10/1961 | Hickman et al. | 18/2 UX |
| 3,150,213 | 9/1964 | Doering | 18/2 UX |
| 3,212,127 | 10/1965 | Flook, Jr. et al. | 18/2 |
| 3,307,215 | 3/1967 | Gerhard et al. | 18/2 |

Primary Examiner—Malcolm A. Morrison
Assistant Examiner—Joseph F. Ruggiero
Attorneys—James J. O'Reilly, C. Henry Peterson, William T. Fryer, III and Cushman, Darby & Cushman ABSTRACT: In one form the method of the present invention provides for the control of a material zone property where the property at one location in the zone is measured by a stationary gauge. The measured property is compared with a desired target property and the regulating apparatus is adjusted to change the measured location property to the desired target property. The target property is adjusted as a function of the difference between the average property of at least a portion of the material across the material width, including the measured location in the zone, and the measured location property to bring the average material property in the zone to the desired target property.

One embodiment of control apparatus in accordance with the present invention comprises a gauge means for indicating the property at one location in a zone of the material and for indicating the property average at least partially across the material dimension including the location. A regulating means can be adjusted to vary the property in the zone. A controller means compares the location property indication with a target signal and actuates the regulating means to change the material property in the zone and reduce the difference between the target signal and the location property indication to substantially zero. Means is provided to offset or change the target signal as a function of the difference between the property average and one target signal representing a desired target property to another target signal representing a desired target property to another target signal to cause the controller means to compare the indicated property with another target signal that brings the average zone property to the desired target property.

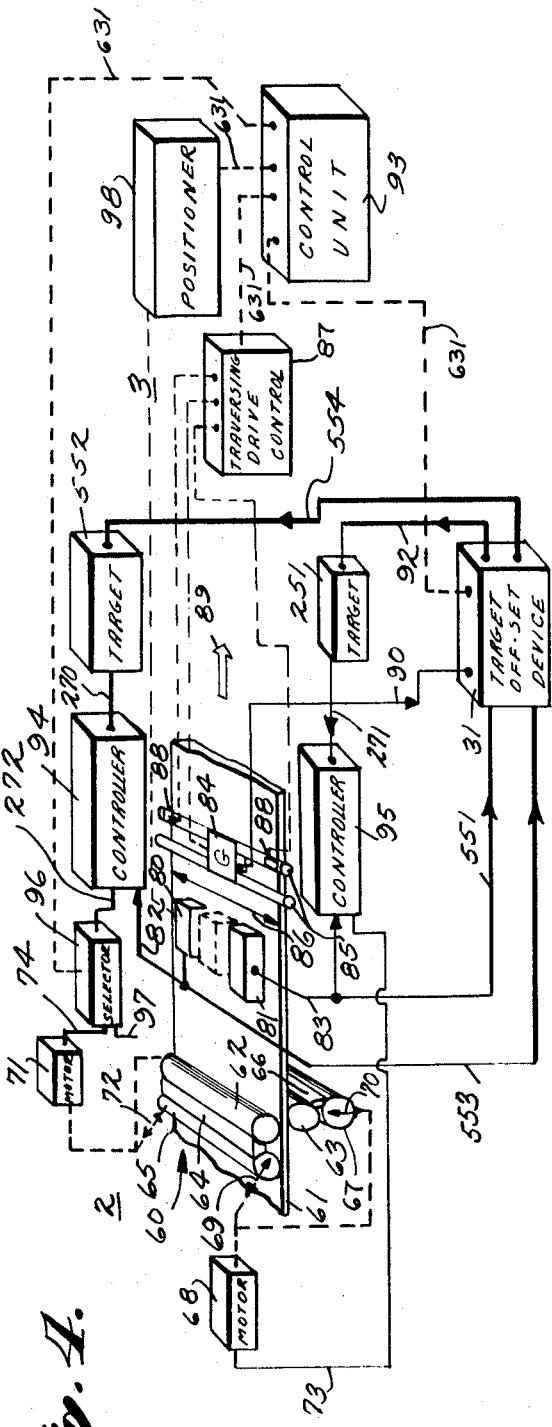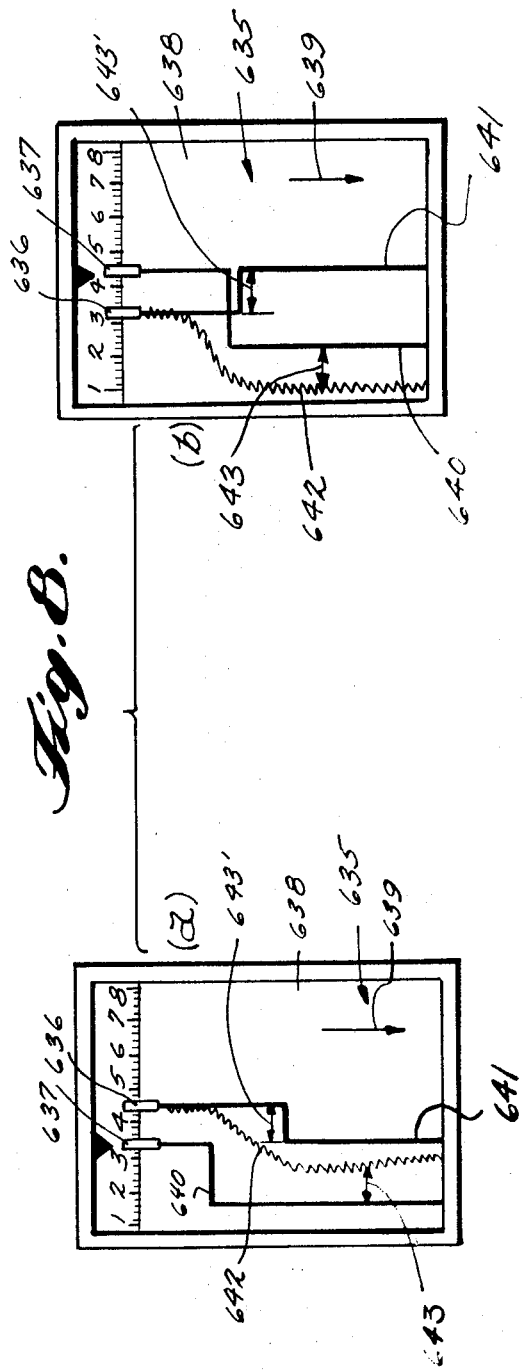

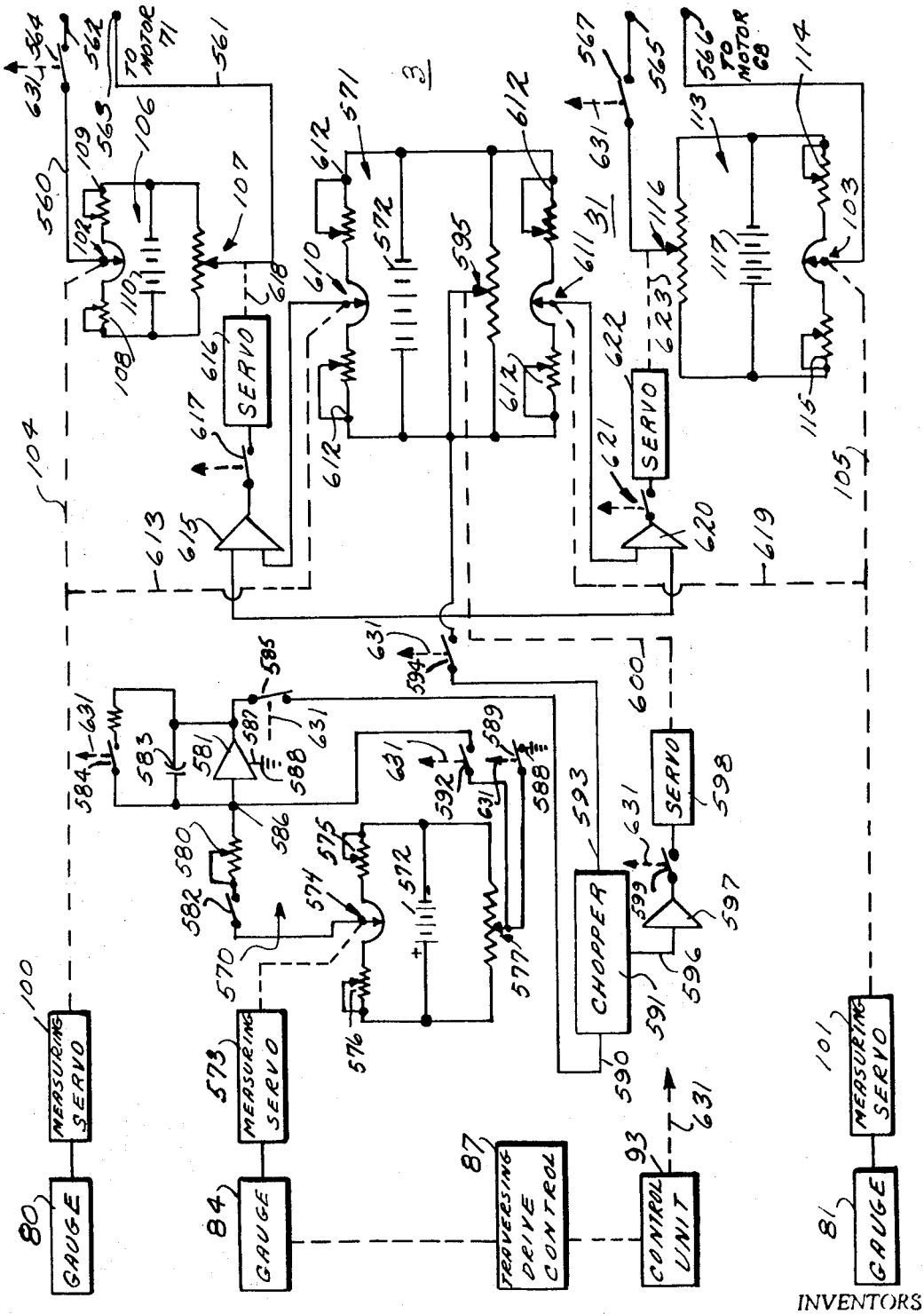

METHOD AND CONTROL APPARATUS FOR REGULATING THE PROPERTY OF A MATERIAL ZONE TO A TARGET PROPERTY

The present invention relates to industrial systems for the production or treatment of a material. More particularly, the present invention is concerned with method and control apparatus for regulating apparatuses to maintain a more uniform property across a material dimension.

The present invention has application to a number of types and arrangements of regulating apparatuses for many different properties. For the purpose of describing a preferred embodiment, the method and control apparatus of the present invention is described as applied to a rubber or plastic calender. Other types of regulating apparatuses and their arrangements in accordance with the present invention will be apparent from the following description.

An important, if not the most important consideration in the manufacture of rubber products, such as tires, is the uniformity of the rubber on the bare fabric cord. Gauges, such as the nuclear radiation type, permit precise measurement of the rubber sheet thickness or mass per unit area at several locations (although weight per unit area is usually used in referring to the measured property in a calendering process, only thickness will be used in the following description to simplify the presentation). These measurements have been used as a basis for adjusting the calender to produce a desired sheet thickness. These adjustments have been with reference to a fixed target representing a target thickness and the gauges were set at locations across the sheet width where tests showed the sheet thickness was at the approximate average of the controlled sheet zone. The assumption was that the profile thickness for a sheet from any given calender once set up remained essentially constant.

This assumption does not hold for many calenders, or for many other types of regulating apparatuses. There is a significant profile thickness variation in some rubber calenders, a profile variation that can change with wear on the calender rolls, temperature of the calenders and the rubber stock, ingredients of the rubber stock, and thickness of rubber being produced, for example. And the fact remains that Calender control should be with reference to the average property for optimum control results.

One approach that has been used for maintaining a substantially uniform property in a controlled zone in the face of profile property variations is illustrated in U.S. Pat. No. 3,000,438, to F. M. Alexander, issued Sept. 19, 1961, and 3,015,126, to W.C. Hays et al., issued Jan. 2, 1962. A single gauge scans across the material dimension of the controlled zone and the average deviation from a fixed target signal, representing a target property, is computed. A regulating apparatus is adjusted using the average deviation as the control signal, to uniformly change the average material property to the target property.

While the adjustment of a regulating apparatus with a control signal that is a function of an average property deviation of the controlled material from a target property is generally known, as mentioned above, method and control apparatus for adjusting a regulating apparatus having one or more stationary gauges for continuous adjustment of one or more controlled zones in the face of profile property variations has not been disclosed heretofore.

It is an object of the present invention to provide method and control apparatus for adjusting a regulating apparatus to maintain a more uniform property across a material dimension.

It is a further object of the present invention to provide method and control apparatus utilizing a stationary gauge that takes into consideration property variation across a material dimension to maintain a more uniform property across the material dimension.

It is a further object of the present invention to provide a simple and relatively inexpensive method and control apparatus for regulating the property of a material zone to a target property.

It is another object of the present invention to provide method and control apparatus for utilizing one or more stationary gauges in a manner that takes into consideration the property variation across a dimension of one or more control zones to maintain the average property of each controlled zone across the dimension substantially at a target thickness for the respective zones.

These and other objects that will be apparent from the following description are achieved by adjusting the regulating apparatus. In one form the method of the present invention provides for the control of a material zone property where the property at one location in the zone is measured by a stationary gauge. The measured property is compared with a desired target property and the regulating apparatus is adjusted to change the measured location property to the desired target property. The target property is adjusted as a function of the difference between the average property of at least a portion of the material across the material width, including the measured location in the zone, and the measured location property to bring the average material property in the zone to the desired target property.

One embodiment of control apparatus in accordance with the present invention comprises a gauge means for indicating the property at one location in a zone of the material and for indicating the property average at least partially across the material dimension including the location. A regulating means can be adjusted to vary the property in the zone. A controller means compares the location property indication with a target signal and actuates the regulating means to change the material property in the zone and reduce the difference between the target signal and the location property indication to substantially zero. Means is provided to offset or change the target signal as a function of the difference between the property average and one target signal to cause the controller means to compare the indicated property with another target signal that brings the average zone property to the desired target property.

The detailed description of the preferred embodiments follows, reference being made to the attached drawings, wherein, FIG. 1 is a perspective view of an industrial system, in block diagram form, for illustrating one type of control apparatus and method of the present invention.

FIG. 4 is a perspective view of a rubber calender and one form of control apparatus, in a block diagram, employing three gauges in accordance with the present invention.

FIG. 5 is a circuit diagram, partially in block diagram form, of a control apparatus for a regulating apparatus, such as shown in FIG. 4 in accordance with the present invention.

FIGS. 8(a) and 8(b) show recorder plots for describing the operation of one embodiment of the present invention.

Figure 1:
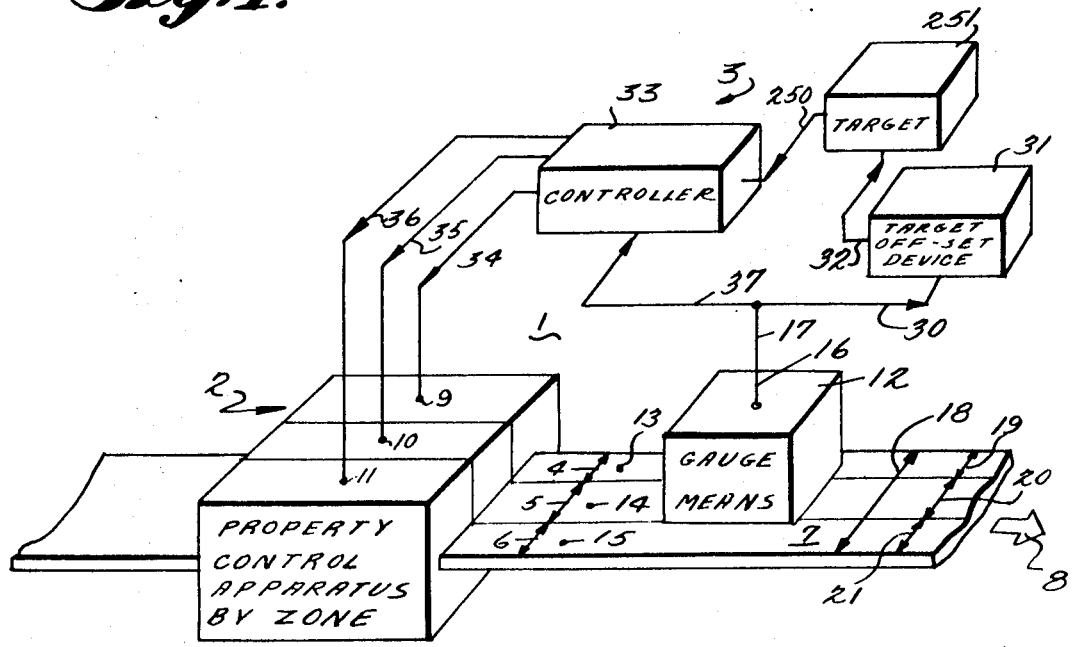

The method of the present invention can be illustrated by the control system 1 in FIG. 1, comprising regulating apparatus 2 and control apparatus 3. Regulating apparatus 2 can take several forms and has the feature of having adjustments, controlled by control signals at inputs 9, 10, and 11, for separately varying a property substantially uniformly in individual zones 4, 5, and 6, respectively, across a dimension, here the width, of material 7 that moves in the direction of arrow 8. The property can be of many kinds, such as moisture, density, thickness, and others in various materials, such as paper, metal, plastics, for example. The term "separately" is used to means that a predominate change occurs only in one zone, the selected one, even though some change of a lesser extent can occur in one or more of the other zones.

Control apparatus 3 includes gauge means 12 for measuring or indicating the property in material 7. One of the functions of gauge means 12 is to measure the controlled property at locations 13, 14, and 15 on material 7 in zones 4, 5, and 6, respectively, and provide a signal at gauge output 16 over line 17 proportional to the property. Another function of gauge means 12 is to scan across a dimension of material 7, here the width, either entirely across the material width, as represented by dimension line 18, or individually across zones of the material width, represented by the width dimension lines 19, 20, and 21. Material zones 19, 20, and 21 can contain the width dimensions of controlled zones 4, 5, and 6, respectively, for example, or at least portions of zones 4, 5, and 6 including locations 13, 14, and 15, respectively. The scanned and controlled dimension need not be material width, as it is apparent that the present invention can be applied to other dimensions of a material. Numerous types and arrangements of gauges can be used to perform these measurements.

The conventional operation of a control apparatus for maintaining a substantially uniform property in zone 4 is to compare the property indication from location 13 in a controller that automatically adjusts the property at location 13 to a fixed target representing a target property. The property at other locations in the zone can be far different from the target property.

In one embodiment of the present invention the average property at least partially across the dimension of zone 4 is computed. The control signal for the regulating apparatus is changed to bring the zone average property substantially to the target property. The zone is controlled with reference to the average zone property.

This method of control is practiced by control apparatus 3 (FIG. 1). The property indication for location 13 is coupled over line 37 to a controller 33 that compares the property indication with a target signal, representing a target property, from a target source 251 and produces a control signal proportional to the difference. The control signal is coupled over line 34 to input 9 of regulating apparatus 2 to adjust the property in zone 4 to the target property. This adjustment continues until the location 13 property is substantially at target property.

Gauge means 16 has supplied the output signal from a scan across the material width, zone 19 for example, to a target offset device 31 over line 30. Target offset device 31 responds to the average property across zone 19 and compares it with the property indication for location 13. If a deviation exists, a target offset control signal is produced over line 32 and coupled to target source 251 to offset or change the target signal on line 250. The target signal change is inversely proportional to the difference between the average of zone 19 and the property indication for location 13, so that the average property of zone 4 is changed substantially to the target property.

Figure 2:
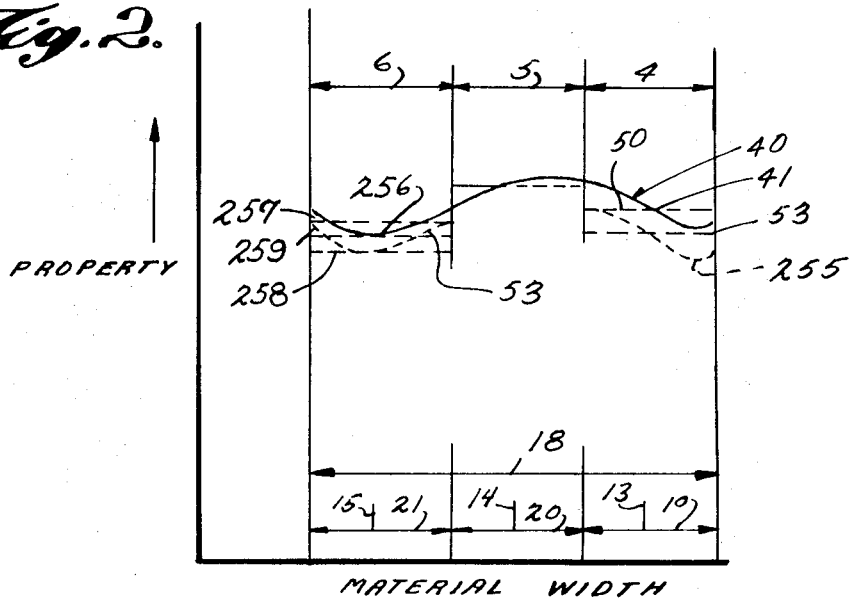
FIG. 2 is a graph of a property versus material width, and shows the average property for individual zones across the width and the location of property-measuring gauges to illustrate the method of the present invention.

The operation of control apparatus 3 is illustrated graphically in FIG. 2, wherein the material property profile is curve 40 and the indicated property at location 13 is at region 41 on curve 40. The zone property average is shown by line 50 above the desired target property represented by line 53. Controller 33 compares the location 13 property at 41 with the target property 53 and sends a control signal to regulating apparatus input 9 to change the property across the dimension of zone 4 to place the location 13 property substantially at target property 53 as indicated by dash line curve 255. Target offset device 31 responds to the difference, if any, between the average property across zone 19 and the location 13 property measurement, but not target offset signal is coupled to target source 251 since the difference in this case is zero.

Another control sequence is illustrated by considering zone 6. The same or a different target property can be set by having another adjustable target signal from target source 251. Considering the example of the same target property 53, the location 15 property region 256 is right on the target property 53. The average property, substantially for zone 6, represented by line 257, is obtained from a scan of zone 21. Controller 33 does not provide a control signal over line 35 at regulating apparatus input 11 since the location 15 and target property are equal. However, because a difference does still exist between location 15 property and average property represented by 257, an offset control signal does come from target offset device 31 to change the target signal to another signal corresponding to a similar target property, represented by line 258. Now the location 15 and target property are unequal; controller 33 provides a control signal over line 36 to regulating apparatus input 11 and the average property of zone 6 is, consequently, decreased to equal the target property 53 as shown by the new profile curve 259.

The control for zone 5 can follow the same pattern. Either another target signal representing a different target property or the same target property can be used. The average of the zone 20, or its close approximation, is compared with the chosen target property. If the location 14 property is substantially at this target property and the zone 20 property average is not equal to this target property, the target signal is offset by furnishing a control signal over line 35 to regulating apparatus input 10.

Figure 3:
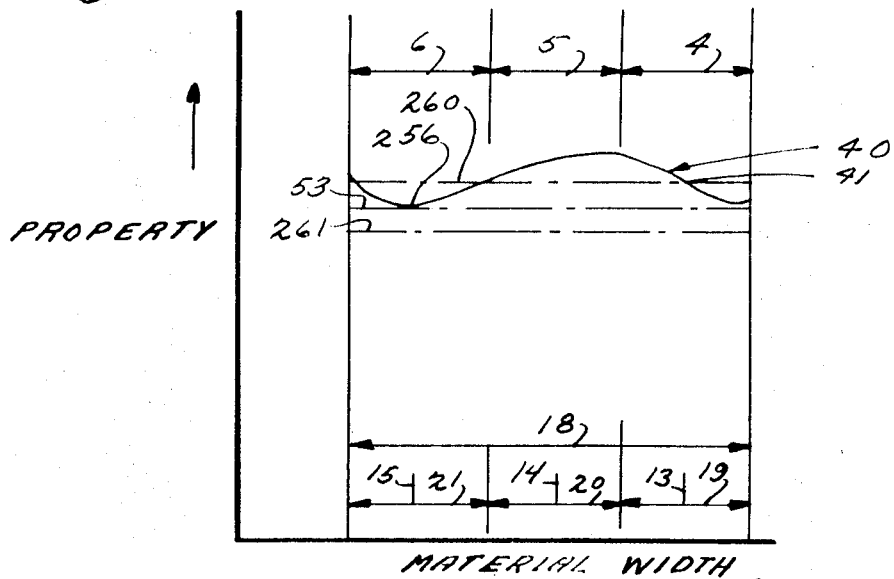
FIG. 3 is a graph of a property versus material width, and shows the property average for the entire width and the location of property-measuring gauges to illustrate the method of the present invention.

It is important to frequently recompute the one or more average properties. Frequent scans permit adjustment for shorter term property variations and a more uniform profile. The scan need not precisely follow the controlled zone, although this is preferable. More or less than the width of the controlled zone along the chosen dimension can be scanned. These compromises are very useful in simplifying the control apparatus. For example, the entire dimension, width 18, including the zones 19, 20, and 21 can be scanned to derive an average property, represented by line 260 in FIG. 3 where curve 40 and target property 53 are shown again. Considering zone 6, for example, controller 33 initially makes no adjustment of regulating apparatus 2 when the target signal is set for the target property 53. Target offset device 31 compares the location 15 property at 256 with the average property 260 and offsets the target signal to a signal corresponding to the new target, represented by line 261. The average property of zone 6 is thereby brought down to substantially equal target property 53. The control of zones 4 and 5 follows the sequences as described above using property average 260 for each zone.

The adjustment and control action are such that the aim is to make the average property and target property equal. However, the factors of human response, apparatus inertia, or built in deadbands sometimes prevent exact equality and the adjustment to substantial equality is the more practical though not limiting form of the method of the present invention.

The method of the present invention is illustrated further by a specific embodiment of a regulating apparatus 2, such as rubber calender 60 (FIG. 4). Rubber calender 60 is one of several conventional designs and much of the apparatus connected with actuating the calender is eliminated or shown in general form to simplify the presentation. Basically, a sheet 61 of bare fabric cords is passed in the direction of arrow 89 between driven rolls 62 and 63 arranged to rotate about stationary axes. Adjacent to roll 62 is a supply of gum rubber 64 that is compressed by a backing roll 65 and placed by roll 62 onto one side of sheet 61. A similar arrangement of a supply of gum rubber 66 and a backing roll 67 coats the opposite side of sheet 61.

The thickness of rubber on sheet 61 is uniformly changed by simultaneously adjusting the spacing between each of backing rolls 65 and 67 and its adjacent roll 62 and 63, respectively, either to a closer or greater spacing equally along their length. The profile thickness of a zone across the width of sheet 61 can be changed by simultaneously adjusting the position at one of backing rolls 65 and 67 by a motor 68 to cause a simultaneous common withdrawal or advance in the directions of arrows 69 and 70 respectively, corresponding to an increase and decrease of thickness, respectively, in a zone across the sheet width at this end of sheet 61. Similarly, the thickness of a zone across the sheet width at the opposite end can be changed by motor 71, as indicated by arrow 72 for backing roll 65 and an arrow corresponding to arrow 70 for backing roll 67. Motors 68 and 71 are energized by separate control signals over lines 73 and 74, Respectively, in one direction to increase thickness and the opposite direction to decrease the rubber thickness. Other methods (not shown) are available for altering the thickness of rubber at zones across the width of the sheet.

The thickness of the rubber on sheet 61 is measured at two locations by gauges 80 and 81 stationarily mounted near opposite edges of sheet 61. Gauges 80 and 81 provide an output signal over lines 82 and 83 respectively proportional to rubber thickness. Average rubber thickness across the width of sheet 61 is derived from a scanning gauge 84 mounted for movement along bars 85. Suitable means is provided (not shown) to drive gauge 84 across the width of sheet 61, represented by dimension line 86, actuated by a traversing drive control 87 in cooperation with limit switches 88 on one of bars 85, as is a conventional practice. The output signal from gauge 84 on line 90 is coupled to target offset device 31 that processes the signal, as previously described, to produce a target offset control signal over line 92 to target source 251 that is a function of the difference between the average thickness of sheet 61 and the indication or output signal from gauge 81 received over line 551. The target offset signal for target source 552, coupled over line 554, is a function of the difference between the average thickness of sheet 61 and the indication or output signal from gauge 80 received over line 553. The coordination of the scanning operation, and other operations to be described later, are accomplished by a control unit 93.

The target signal from target sources 251 and 552 are coupled to separate controllers 95 and 94 over lines 271 and 270, respectively. Alternatively, a single controller can be utilized. Controllers 94 and 95 continuously compare the respective target signal with the output signal from gauges 80 and 81, respectively, coupled over lines 82 and 83, respectively. Each controller continuously produces a control signal proportional to the difference between target signal an gauge output signal. The control signal from controller 95 is coupled directly over line 73 to energize motor 68 in the direction to change the rubber thickness to the thickness corresponding to the desired target thickness set by the target signal. The control signal from controller 94 is coupled over line 272 to a selector 96 that has one position coupling the control signal directly to motor 71 to change the rubber thickness to the thickness corresponding to the target signal set to the desired target thickness. Selector 96 has another position which couples the control signal to line 97, for a purpose to be described hereinafter.

Control unit 93 initiates a scan of sheet 61 periodically to replace the target offset signal from target offset device 31 with a more recently computed average property. The target signals are changed, or offset, to bring the average thickness across the sheet width to the desired target thickness value. After each scan by gauge 84 the average property or its equivalent is recomputed and the target signals are offset in accordance with any change from the previously computed property average.

SOme rubber calenders or other similar regulating apparatuses have provision for separately adjusting the rubber thickness at the center of the sheet. For example, cross-axis or roll bending adjustment can be used. With such an arrangement control unit 93 periodically actuates a positioner 98 that moves gauge 80 to a position at the center of sheet 61. Selector 96 is actuated by control unit 93 to connect the output of controller 94 to line 97 which energizes the motor (not shown) that initiates the changes to make the indicated rubber thickness at the sheet center substantially equal to the target thickness. The target signal is offset as described above.

Control apparatus can proportion in several arrangements to practice the method of the present invention. For example, the manner of computing and introducing the target offset step can be accomplished in several ways. The conventional controller, utilizing a fixed target, can be modified simply by offsetting the target in proportion to the difference between the average property and the location property indicated by a gauge. Another approach is to use a computer that compares the target signal with the output signal of the fixed gauges to adjust the regulating apparatus and computer and compares the average property with the output signal of the gauges to offset the target signal, in effect, performing both computer and controller functions.

A control apparatus embodiment that adjusts, offsets, the target signal of a conventional controller for the industrial system 1 shown in FIG. 4 is illustrated in FIG. 5. Each of gauges 80 and 81 has a measuring servo 100 and 101, respectively, that adjusts the position of the arm of repeat slidewire potentiometers (SW pots.) 102 and 103, respectively, as indicated by dash lines 104 and 105, respectively. SW pot. 102 forms a part of a controller computer 106, a DC bridge having a target potentiometer (T pot.) 107 connected at opposite ends to one end of separate adjustable resistors 108 and 109. The other ends of adjustable resistors 108 and 109 are connected to opposite ends of SW pot. 102 and across a DC source, such as battery 110.

The control signal from controller computer 106 is proportional to the difference between the indication from gauge 80 and the target signal or potential at the arm of T pot. 107. This control signal appears at terminals 562 and 563, terminal 562 being coupled through switch 564 to the arm of SW pot. 102 and terminal 563 being coupled to the arm of T pot. 107, and is amplified to ultimately energize motor 71.

The control signal for motor 68 is derived in a corresponding manner by controller computer 113, a DC bridge that includes adjustable resistors 114 and 115 connecting together, by their fixed ends, the fixed ends of SW pot. 103 and T pot. 116. Controller computer 113 is energized by a DC source 117 connected across the fixed ends of T pot. 116. The control signal from controller computer 113 is proportional to the difference between the indication from gauge 81 and the target signal or potential at the arm of T pot. 116. This control signal appears at terminals 565 and 566, terminal 565 being coupled through switch 567 to the arm of T pot. 116 and terminal 566 being coupled to the arm of SW pot. 103, and is amplified before energizing motor 68.

Motors 68 and 71 are normally coupled to their respective controller computers 106 and 113, switches 564 and 567 being closed. The control signals continue to energize the motors 68 and 71 until the indicated thickness of sheet 61 is substantially equal to the desired target thickness set by the arms of T pots. 103 and 107 that provide the target signals, or for a time equivalent to this desired thickness change.

The target signals from controller computers 106 and 113 are changed by target offset device 31 as a function of the difference between the respective gauge indications and the average thickness across the sheet width 86. Target offset device 31 comprises a profile average computer (PAC) 570 and an offset computer 571. Profile average computer 570 and offset computer 571 are shown as circuits with separate and identical power sources 572 of equal voltage and characteristics to simplify the presentation. HOwever, these circuits preferably are arranged with a common power source, essentially placing each potentiometer in parallel across the power source.

Profile average computer 570 may take several forms and provides a signal that is a function of the average thickness of sheet 61 across width 86. The output signal of gauge 84 is coupled to measuring servo 573 that drives the arm of SW pot. 574 in a DC bridge comparison circuit comprising power source 572, such as a battery, adjustable resistors 575 and 576 and a T pot. 577. The arm of T pot. 577 is set to produce a target signal corresponding to the desired target thickness. The same target signal is initially set on T pots. 103 and 107, for example. The output signal from the bridge of profile average computer 570 is the difference between the thickness indication from gauge 84 and the target thickness, taken between the arms of SW pot. 574 and T pot. 577.

The thickness deviations across the width 86 of sheet 61 from the desired target thickness are integrated in profile average computer 570 to obtain a signal that is a function of the average deviation. When the scan of gauge 84 commences the arm of SW pot. 574 is coupled by closing switch 582, to the input of an operational amplifier comprising adjustable input resistor 580, amplifier 581 and integrating capacitor 583. Resistor 580 is coupled to input terminal 586 of amplifier 581 and the other input terminal 587 of amplifier 581 is connected to ground 588. Switches 584 and 585 are opened and the arm of T pot. 577 is connected, by closing switch 589, to ground 588. The voltage across capacitor 583, after the completion of the scan, is proportional to the average of the width thickness deviations.

The average thickness across the sheet width 86 is derived from profile average computer 570 by combining the voltage across capacitor 583 and the target signal at the arm of T pot. 577. After the scan of width 86 has ended switches 582 and 589 are opened, and switch 585 is closed to connect the output side of capacitor 583 to an input 590 of a chopper 591. The input end of capacitor 583 is coupled, by closing switch 592, to the arm of T pot. 577. The voltage at chopper input 590 is proportional to the average thickness of sheet 61 with reference to the bridge with a power source 572. Since offset computer bridge 571 also has a power source 572 of the same DC voltage and characteristics the voltage reference is the same for offset computer 571 and profile average computer 570. Chopper 591 has another input 593 that is coupled, by closing switch 594, to the arm of T pot. 595, connected across power source 572 in offset computer bridge 571. Chopper 591 compares the voltages at inputs 590 and 593 and produces a signal at output 596 proportional to the difference that is coupled through amplifier 597 to a servo 598, by closing switch 599. Servo 598 drives the arm of T pot. 595, as indicated by dash line 600.

The target signal at the arm of T pot. 595 is a function of the width average thickness. The output from chopper 591 is such that the arm of T pot. 595 is driven in the appropriate direction until the target signal thereat equals the voltage at chopper input 590. After the width average thickness signal is established for offset computer 571, switches 594 and 599 are opened, removing the chopper output signal from the arm of T pot. 595.

Offset computer 571 compares the measured thickness at the locations of stationary gauges 80 and 81 with the width average thickness. T pot. 595 and SW pots. 610 and 611, with power source 572 and the adjustable resistors 612 form two DC bridges. Measuring servo 100 also drives the arm of SW pot. 610, as indicated by dash line 613 and an offset signal is produced between the arm of SW pot. 610 and T pot. 595 for controller computer 106. The offset signal is zero if the location thickness indicated by gauge 80 equals the width average thickness. If the indicated location thickness is greater or smaller than the width average thickness the offset signal will be of different polarity and of a magnitude that is proportional to the difference. The offset signal is fed through an amplifier 615 to a servo 616, by closing switch 617, that drives the arm of T pot. 107 of controller computer 106, as indicated by dash line 618. Servo 616, in response to the offset signal, offsets the target signal of controller computer 107 as a function of this difference to change the control point from the desired target thickness to another target thickness, and ultimately bring the width average thickness substantially to the desired target thickness.

Similarly, the location indication from gauge 81 is compared with the width average thickness and the target signal of controller computer 113 is offset. Measuring servo 101 also drives the arm of T pot. 611, as indicated by dash line 619.

The arms of T pot. 595 and SW pot. 661 are connected to the input of amplifier 620, providing an offset signal that is a function of the difference between the width average thickness and the thickness at the location of gauge 81, with a magnitude proportional to the difference and polarity representing the relationship i.e. greater or smaller. The output from amplifier 620 is coupled, by closing switch 621, to servo 622 that drives the arm of T pot. 116, as represented by dash line 623, in controller computer 113. The arm of T pot. 116 is offset to change the target signal as a function of the difference between the thickness indication of gauge 81 and the width average thickness, to change the control point and ultimately bring the width average thickness substantially to the desired target thickness.

The operation of the control apparatus of FIG. 5 begins with the continuous adjustment of regulating apparatus 2 whenever the indicated thickness deviates from the target thickness and switches 564 and 567 are closed. The arms of T pots. 107 and 103 of the controller computers 106 and 113, respectively, are at the desired target thickness position. Gauge 84 scans sheet 61 and the width average thickness is computed and set into T pot. 595. Then the target signal of each of controller computers 106 and 113 is continuously or intermittently offset as a function of the difference between the indications of the respective gauges and the width average thickness. The control signal from each of controller computers 106 and 113 adjusts the respective controlled zones to the new target thickness that brings the sheet width average thickness substantially to the desired target thickness. If desired, the energization of motors 68 and 71 can be interrupted during the computation and setting in of the width average thickness, and during offsetting of tee target signals. Then switches 564 and 567 can be closed to resume the control of sheet profile thickness.

The average width thickness information is preferably replaced periodically by initiating another scan of gauge 84. Before the scan begins capacitor 583 is discharged, by momentarily closing switch 584, and closing switches 582 and 589, switches 592 and 599 being opened. Profile average computer 570 and offset computer 571 then go through the aforesaid sequence.

The operation of the switches shown in FIG. 5 in the sequence as aforesaid is provided automatically by a control unit 93 in a conventional manner. The control relation between these switches and control unit 93 is symbolized by dash lines 631 from control unit 93 to each of the switches. Control unit 93 initiates the periodic scan of gauge 84 by energizing traversing drive control 87 and controls the sequence of switching that establishes a new sheet with average thickness signal in offset computer 571.

Figure 6:
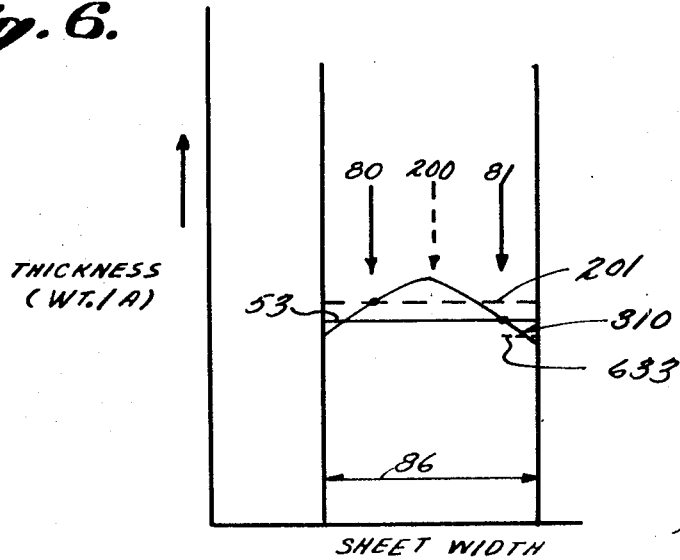
FIG. 6 is a graph of sheet thickness and average sheet thickness versus sheet width to illustrate the operation of the control apparatus shown in FIGS. 4 and 5.

The operation of the control apparatus 3 depicted in FIGS. 4 and 5 is illustrated in FIG. 6 by reference to an assumed profile curve 310 of sheet thickness versus sheet width with the positions of gauges 80 and 81 being designated by arrows bearing these respective reference numerals. If a nuclear transmission gauge is used the output signal is also a function of weight per unit area. Where an adjustment for the center of the sheet is available, a gauge can be placed at one location designated by arrow 200 (dash line). The average thickness across width 84 is computed, as previously described, as represented by dash line 201. The sheet thicknesses at the location of gauges 80 and 81 is greater than the target thickness 53. Each of controller computers 106 and 113 initiates a control signal that energizes motors 68 and 71, respectively, to decrease the sheet thickness at the location of gauges 80 and 81, respectively, to the target thickness 53.

The target signals of controller computers 106 and 113 are offset as a function of the difference between the sheet width average 201 and the thickness at the locations of gauges 80 and 81. The target signal of controller computer 106 is not offset, since the thickness at the location of gauge 80 is at the width average thickness 201. The target signal at the location of gauge 81 is offset, even though the thickness at this location is at target thickness 53, in proportion to the difference between the average thickness 201 and the thickness at the location of gauge 81. The new target or control point is represented by dotted line 633. The combined action of controller computers 106 and 113 decreases the sheet thickness at the locations of gauges 80 and 81 and acts to bring the sheet width average thickness to the target thickness 53, resulting in an average thickness across sheet 61 closer to the desired target value.

As mentioned previously the average thickness can be either of the entire sheet width or partially or entirely across the controlled zone including the measured location. It is preferable, of course, to have a separate average for each controlled zone. However, the compromise of using the entire sheet width average still is useful and reduces the amount of control apparatus required.

Figure 7:
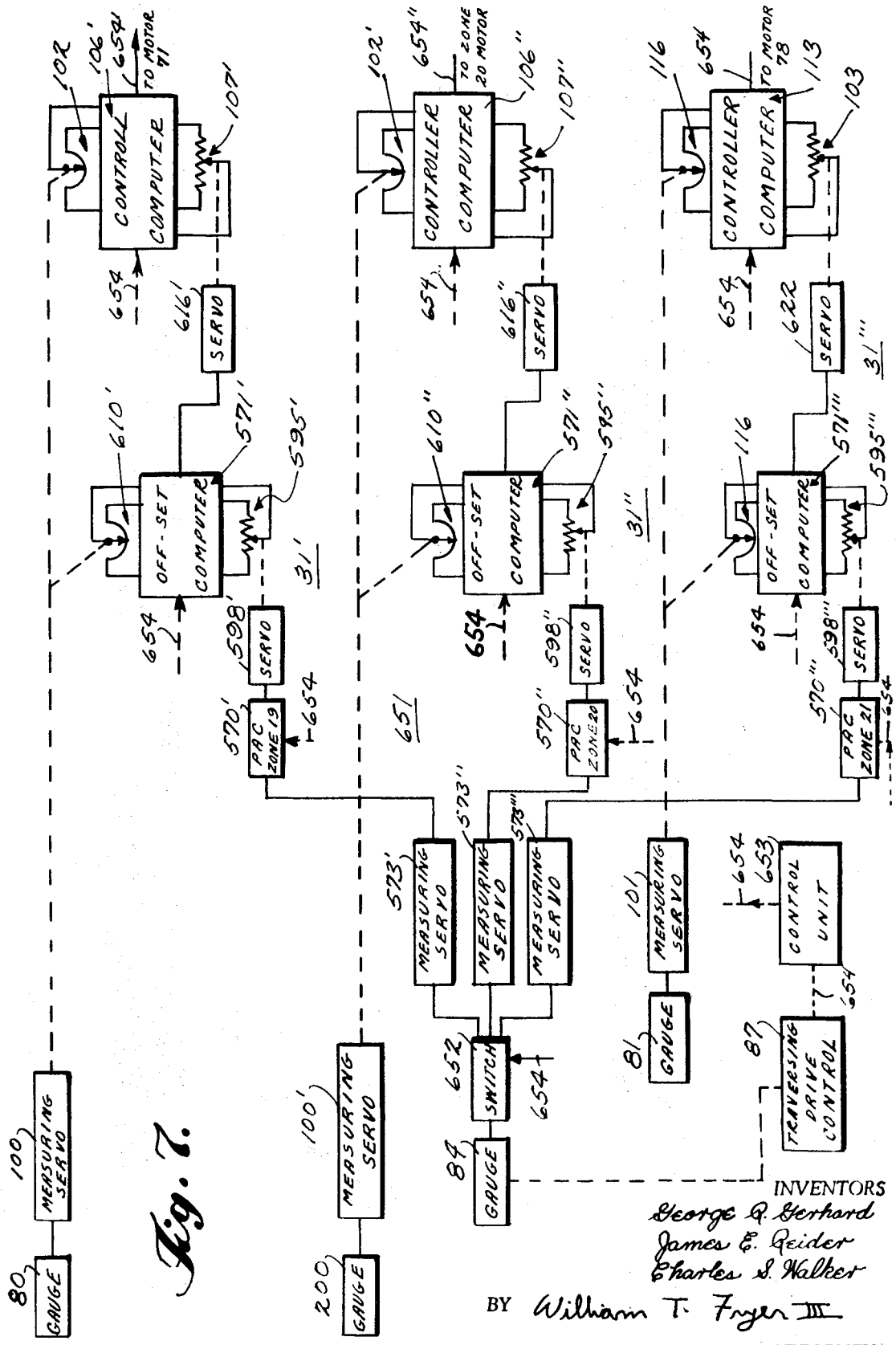
FIG. 7 is a block diagram of another form of control apparatus in accordance with the present invention.

An example of control apparatus 651 with zone average scanning as hereinbefore outlined, is illustrated in FIG. 7. Most of the control apparatus components have been described hereinbefore and are designated by the same reference numeral or, where the component is essentially a duplicate of a previously described component, its reference numeral is the same with a different prime marking. Components with the same reference number and different prime markings are referred to collectively by the reference numeral only.

The indication from scanning gauge 84 for the scanned zones across the sheet width is separated and processed to derive a signal for each zone proportional to the thickness average. The indication from scanning gauge 84 can be processed in a number of ways. For example, U.S. Pat. No. 3,000,438 to F.M. Alexander, issued Sept. 19, 1961, describes a basic scheme for switching the output of a scanning gauge to separate integrators to separate out the thickness indications of each zone. The same switching scheme can be used here, as represented by switch unit 652 and control unit 653 to couple the output signal of gauge 84 to target offset devices 31 for each of zones 19, 20, and 21 (identified in FIG. 1) on sheet 61. Each of target offset devices 31 for zones 19, 20 and 21 comprises a profile average computer 570 and target offset computer 571 arranged essentially as described for the control apparatus 3 of FIG. 5. The controller computers for each gauge energize the motor or other devices for uniformly controlling the thickness in the zone where the associate gauge is stationarily located.

The output signal from scanning gauge 84 for zones 19, 20, and 21 is selectively coupled to through switch 652 to a separate measuring servo 573 for each zone so that the indication for each zone is separated and directed to one of profile average computers 570 for each zone. The profile average computers 570 are prepared for the computation of zone average by control unit 653 and then the associated switches are controlled to have the servos 598 set T pots. 595 to the target signal representing the zone averages for the respective zones. Then target offset computers 571 cause servos 616 and 622 to offset the target signal from T pots. 107 and 103 of controller computers 106 and 113. Controller computers 106 and 113 provide control signal at output lines 654 that is a function of the difference between the thickness at the location of the associated gauge and the offset target thickness. The control signals from controller computers 106 and 116 can be provided continuously to the respective motors or other devices of regulating apparatus 2, even during target offset, or can be interrupted during target offset and resumed thereafter, if desired, through the operation of control unit 653.

A periodic scan of sheet 61 by gauge 84 is initiated by control unit 653 that energizes traversing drive control 87. Control unit 653 sets up and sequences the switches in the target offset devices 131 to establish the current thickness average for each of zones 19, 20, and 21. The operation of the switch 652, the target offset devices 131, and traversing drive control 87 by control unit 653 is symbolized by the dash lines 654.

Several other combinations of gauges can be used with the present invention. For example, there can be less than or more than three controlled zones each with a fixed gauge positioned therein and coupled to a controller that compares the gauge output signal with a target signal corresponding to target property. Each controller target can be offset in the manner described previously. In another combination a single gauge can be positioned successively to a location in each zone to provide an output signal proportional to the property in each location. The one gauge performs the function of three or more gauges. At each location the gauge output signal is compared with a target signal corresponding to target property and the target signal is offset. Another arrangement is the elimination of all but one gauge. This gauge is programed first to scan the sheet width or zone and then to measure the property at a location in each zone. The property at each location is compared with the target property for the zone or across the material dimension and the target signal is offset, as described above.

The operation of control apparatus 651 is illustrated by considering the display on a recorder 635, FIGS. 8(a) and 8(b). Recorder 635 has pens 636 and 637 that can move laterally over a sheet or recorder chart 638 that is drawn in the direction of arrow 639. The lateral movement of pen 637 is controlled by the width average thickness signal (the target signal set into T pot. 595' of offset computer 571') of zone 19, for example, and a curve 640 of the width average thickness is drawn. The lateral movement of pen 636 is controlled by a target signal of a controller computer (the target signal for zone 19 set into T pot. 107', for example) and a curve 641 of the target thickness or control point for gauge 80 is drawn. Another pen (hidden from view by pen 636) moves laterally over sheet 638 controlled by the indication from gauge 80 to draw the curve 642. The numbers on the recorder are arbitrary units of measurement, but they may increase with increasing thickness as shown.

Considering the display on recorder 635 of FIG. 8(a), the target thickness curve 641 shows that target thickness for zone 19 is initially higher than the width average thickness of curve 640 and the actual thickness at the location of the gauge 80 is between the width average thickness and the target thickness. The difference between the average thickness and the gauge indication is shown by the dimension line 643 between the curves 640 and 642. The desired thickness is offset by the same difference, by offsetting the target signal in proportion to the difference indicated by dimension line 643', as shown. This target offset causes the controller computer 106' to control to a new target thickness. The thickness at the location of gauge 80 increases to the offset target thickness and the width average thickness curve increases to substantially equal the desired target thickness. Gauge 80 with offset target 636 and control apparatus 3 will maintain the average thickness in zone 19 substantially at the desired target thickness due to the target offset compensating for the difference between the zone average and the gauge measurement.

Another display on recorder 635 is shown in FIG. 8(b). Initially the thickness at the location of gauge 80 is lower than the average thickness and the target thickness. The target thickness is offset, decreased, by an amount, represented by dimension line 643', that is the difference between the gauge indication and average thickness 640, as shown. After the target signal of controller computer 107' is offset, the thickness at the location of gauge 80 increases to the offset target thickness and the average thickness of zone 19 increases to the desired target thickness. Gauge 80 with offset target 636 and control apparatus 3 will maintain the average thickness in zone 19 substantially at the desired target thickness due to the target offset, compensating for the difference between the zone average and the gauge measurement.

It is apparent that the regulating apparatus 2 (FIG. 1) can be designed for any type of property to uniformly change the property across a zone in response to a control signal. Target offset will permit the use of a stationary gauge to maintain the zone average property at the desired target thickness and provide a more uniform property profile across the material dimension. In addition, the offset of the control signal for the regulating apparatus can be accomplished in several other ways, such as by inserting the signal used to offset the target signal in other places in the control apparatus. For example, the offset signal can be in series with the control signal from the controller computer to change the regulating apparatus adjustment in accordance with the present invention.

The above-described and other embodiments of control apparatuses can be modified, rearranged, or have substitute components without departing from the present invention. The method of the present invention can be practiced by many combinations of control apparatuses for the operation of numerous types and arrangements of regulating apparatuses. These changes and other arrangements are within the scope of the present invention as defined in the appended claims.

What is claimed is:

1. A method of controlling a property of a zone of material where the property at one location in the zone is measured by a stationary gauge and the measured property is compared with a target to determine the degree of apparatus adjustment necessary to change the zone material property to a target property, comprising the step of,
   adjusting said target to bring the zone average property substantially to the target property.

2. A method of controlling a property of a zone of material where a single point gauge is positioned to measure the property at one location in the zone, a regulating apparatus is arranged to change the zone property substantially uniformly by adjustment, the adjustment of the regulating apparatus being with reference to a target representing a target property, comprising the step of,
   adjusting said target as a function of the difference between the average property of the zone and the property measured at said location, to change the zone average property to the target property, so that said single point gauge effectively controls with respect to the average zone property.

3. A method of controlling a property in several zones across a material dimension where the property at a location in each zone is measured by a gauge means and the measured property in each zone is compared with a separate target to determine the degree of regulating apparatus adjustment necessary to change the measured property in each of the zones to a target property for each of said zones, comprising the step of,
   Adjusting said target for each of the zones as a function of the difference between the measured property and the average property of the respective zones across the material dimension to bring the average material property in each zone to the target property for the zone.

4. Control apparatus for adjusting a regulating means that varies the property in a zone at least partially across the material dimension, the control apparatus comprising,
   gauge means for providing a first output signal that is a function of the property at one location in said zone and providing a second output signal that is a function of the property average at least partially across the material dimension including said location,
   controller means for comparing said first gauge means output signal with a target signal representing a target property from an adjustable target source and producing a first control signal for actuating said regulating means to reduce the difference between said location property and said target property to substantially zero,
   means for producing a second control signal that is a function of the difference between said gauge means first output signal and said gauge means second output signal and adjusts said target source to bring the zone average property substantially to said target property for effective control of the zone property with respect to the zone average property.

5. Control apparatus for adjusting a regulating means that substantially uniformly varies the property in a zone at least partially across the material dimension, the control apparatus comprising,
   gauge means for indicating the property at one location in said zone of the material and for indicating the property average at least partially across the material dimension including said location,
   controller means for comparing said one location property indication with a target signal and producing a first control signal for actuating said regulating means to reduce the difference between said target signal and the location property indication to substantially zero, and
   means for changing said target signal as a function of the difference between said indicated property average and said indicated location property to cause said controller means to compare the indicated property with another target signal that brings the average zone property to said desired target property.

6. Control apparatus for adjusting a regulating means that substantially uniformly varies the property in a zone at least partially across the material dimension, the control apparatus comprising,
   gauge means for indicating the property at one location in said zone of the material and for indicating the property average at least partially across the material dimension including said location,
   controller means for comparing said one location property indication with a target signal and producing a first control signal for actuating said regulating means to reduce the difference between said target property and said indicated location property to substantially zero, and
   means for changing said target signal to bring the zone average property substantially to said target property.

7. Apparatus for maintaining a substantially uniform property across a dimension of a material comprising,
   gauge means for indicating the property at a location in each of several zones across the material dimension and for indicating the property average in each of said zones,
   regulating means for separately varying the property in each of said zones,
   controller means coupled to said gauge means and to said regulating means for continuously comparing the indicated property in each of said zones with a target signal for the respective zone to energize continuously said regulating means and change the property at each of said locations to a target property set by the target signal for each zone,
   means for at least intermittently varying the target signal for each zone as a function of the difference between the indicated property average for each zone and said indicated location property for the respective zones to change the target signal from one target signal representing the desired target property to another target signal, causing said controller means to compare the indicated property with said another target signal that brings the indicated zone property average to said desired target property.

8. Apparatus for maintaining a target property across a material dimension, comprising,
   first gauge means for indicating the property at one location across the material dimension,
   regulating means for substantially uniformly changing the property across the material dimension including said one location,
   second gauge means for indicating the average property deviation from the target property across the material dimension including said location,
   means for controlling said regulating means to change the material property across the material dimension in response to the difference between a target signal representing the target property and the indicated property at said one location, and for changing said the target signal as a function of the difference between the indicated average property and the indicated property at said location to change the material average property to substantially equal the target property.

9. Apparatus, as described in claim 8, wherein,
said controlling means comprises a first computer that provides a first signal proportional to the difference between a target signal, representing the target property from an adjustable target source, and the indicated property at said location, a second computer that provides a second signal proportional to the average property across the material dimension, a third computer that provides a third signal proportional to the difference between the indicated property at said location and said second signal, and means receiving said third signal and coupled to said target source to change the target signal.

10. A control apparatus for adjusting a regulating apparatus to uniformly change a property across a material dimension,
said control apparatus comprising,
a stationary gauge for indicating the property at a location across said material dimension,
means for producing a control signal for energizing said regulating apparatus to change said location property to a target property, and
means for offsetting said control signal to change the average property across said dimension substantially to said target property.

11. A method of controlling a property across a material dimension where the property at one location across the dimension is measured by a stationary gauge and the measured property is compared with a target to derive a control signal that adjusts an apparatus to uniformly change the material property across the dimension, thereby maintaining the location property at a desired target property, comprising the step of,
adjusting said apparatus to maintain the average property across said dimension substantially at said desired target property.

12. In combination with apparatus for controlling a property across a zone with an adjustment means that substantially uniformly changes said property across said zone in response to a control signal and gauge means located in said zone for producing a control signal that is a function of said property at one location in said zone and a signal responsive to the property average across said zone, the improvement comprising means responsive to said zone property average signal for adjusting said control signal, to bring said zone average property substantially to a desired property.

13. Apparatus, as described in claim 12, wherein said gauge means produces a first signal that is a function of said location property, said gauge means comprises means for comparing said first signal with a target signal for a desired property, to produce said control signal that is a function of the difference between said target signal and said first signal, said target signal is continuously compared with said first signal, said gauge means comprises means for scanning said zone to obtain a third signal responsive to said zone property average and said responsive means comprises means for adjusting said control signal in response to the difference between said first and said third signals, to bring said zone average property substantially to said desired property.

14. Apparatus, as described in claim 12, wherein said gauge means produces a continuous first signal that is a function of said location property, said gauge means comprises means for comparing said first signal with a target signal for a desired property, to produce said control signal that is a function of the difference between said target signal and said first signal, said target signal is continuously compared with said first signal, said control second signal continuously indicates the difference between said target signal and said first signal, said gauge means comprises means for scanning said zone to obtain a third signal responsive to said zone property average and said responsive means comprises means for adjusting said control signal in response to the difference between said first and said third signals and said adjusted control signal continuously indicates the degree of said apparatus adjustment needed to bring said zone average property substantially to said desired property.

15. Apparatus, as described in claim 12, wherein said property average responsive signal is recomputed frequently from more current scans across said zone and said adjusting means frequently readjusts said control signal in response to said recomputed property average signal.

16. Apparatus for use with a control means that changes a property substantially uniformly across a zone in response to a control signal, comprising
gauge means for producing a control signal that is a function of the property at one location in said zone and a signal responsive to the property average across said zone obtained by scanning said zone,
means responsive to said zone property average signal for adjusting said control signal to bring said zone average property substantially to a desired property.

17. Apparatus, as described in claim 16, wherein said property average responsive signal is recomputed frequently from more current scans across said zone and said adjusting means frequently readjusts said control signal in response to said recomputed property average signal.

18. Apparatus, as described in claim 16, wherein said gauge means produces a first signal that is a function of said location property, said gauge means comprises means for comparing said first signal with a target signal for a desired property, to produce said control signal that is a function of the difference between said target signal and said first signal, said target signal is continuously compared with said first signal, said gauge means comprises means for scanning said zone to obtain a third signal responsive to said zone property average and said responsive means comprises means for adjusting said control signal in response to the difference between said first and said third signals, and said adjusted control signal continuously indicates the degree of said apparatus adjustment needed to bring said zone average property substantially to said desired property.

19. Apparatus, as described in claim 18, wherein said responsive means changes said target signal as a function of the different between said first and said third signals.

20. Apparatus, as described in claim 16, wherein said gauge means produces a continuous first signal that is a function of said location property, said gauge means comprises means for comparing said first signal with a target signal for a desired property, to produce said control signal that is a function of the difference between said target signal and said first signal, said target signal is continuously compared with said first signal, said control signal continuously indicates the difference between said target signal and said first signal, said gauge means comprises means for scanning said zone to obtain a third signal responsive to said zone property average and said responsive means comprises means for adjusting said control signal in response to the difference between said first and said third signals and said adjusted control signal continuously indicates the degree of said apparatus adjustment needed to bring said zone average property substantially to said desired property.

21 Apparatus for use with a control means that changes a property substantially uniformly across a zone in response to a control signal, comprising
gauge means for producing a first signal continuously responsive to the property at one location in said zone,
means for continuously comparing said first signal with a target signal for a desired property to produce a control signal that is continuously responsive to the difference between said target signal and said first signal,
said gauge means producing a third signal that is a function of the property average across said zone, and
means responsive to said third signal for adjusting said control signal to bring said zone average property substantially to said desired property.

22. Apparatus, as described in claim 21, wherein said third signal is recomputed frequently from more current scans across said zone and said adjusting means frequently readjusts said control signal as a function of the difference between said recomputed third signal and said first signal.

23. Apparatus for indicating a property of a zone of material, comprising
gauge means for producing a control signal that is a function of the property at one location in the zone and a signal responsive to the property average across said zone obtained by scanning said zone,
means for adjusting said control second signal as a function of the difference between said location property and said zone property average signal.

24. Apparatus, as described in claim 23, wherein said property average responsive signal is recomputed frequently from more current scans across said zone and said adjusting means frequently readjusts said control signal in response to said recomputed property average signal.

25. Apparatus for indicating a property of a zone of material, comprising
gauge means for producing a first signal continuously responsive to the property at one location in the zone,
means for continuously comparing said first signal with a target signal for a desired property, to produce a second signal that is continuously responsive to the difference between said target signal and said first signal,
said gauge means producing a third signal of constant value that is a function of the property average across said zone derived from scanning said zone, and
means responsive to said third signal for adjusting said second signal as a function of the difference between said third signal and said first signal.

26. Apparatus, as described in claim 25, wherein said third signal is recomputed frequently from more current scans across said zone and said adjusting means frequently readjusts said second signal as a function of the difference between said recomputed third signal and said first signal.

27. A method of indicating the deviation of the average property across a zone of material from a desired target property where the property at one location in the zone is measured by a gauge means to produce a signal that indicates the necessary degree of adjustment of apparatus that produces substantially uniform changes of said property across said zone to change the average zone material property to a target property, comprising the step of,
modifying said indicated signal as a function of the difference between said measure location property and said average zone property, to indicate the degree of apparatus adjustment that is needed to bring said zone average substantially to a desired target property.

28. A method of indicating a property of a zone of material where the property at one location in the zone is measured by a gauge means that produces a signal responsive to said location property comprising the steps of frequently recomputing the difference between said property at said one location and the zone average property and offsetting said signal as a function of said recomputed difference.

29. A method of controlling a property of a zone of material with an adjustment that substantially uniformly changes said property across said zone where the property at one location in the zone is measured by gauge means that produces a signal that indicates the degree of apparatus adjustment necessary to charge the zone material property to a desired target property, comprising the step of changing said signal to indicate the degree of apparatus adjustment that brings the zone average property substantially to said desired target property.